ELECTROCHROMIC DISPLAY DEVICE

BACKGROUND OF THE INVENTION

1. Field of the Invention

This invention relates to an electrochromic display device to effect reversible coloring by the application of a voltage and a method for forming an electrochromic film to be used therefor and in particular to the $WO_3$-sputtered film forming process with a DC or high-frequency sputtering device and to an electrochromic display device in which high reliability and durability can be obtained by controlling the applied voltage to cause the $WO_3$-sputtered film to operate in the unsaturated condition.

The electrochromic display device is a non-light-emitting type display device utilizing the electrochromic phenomenon, which has a number of excellent advantages such as clear color display, smaller power consumption, no dependence on visual angle, wider operating temperature range and possibility of large-scale display, etc. in comparison with the conventional display devices such as LED and liquid crystal displays, etc. The electrochromic display device has an electrochromic film formed on a substrate, which electrochromic film is colored or discolored depending on the direction of voltage application.

2. Description of the Prior Art

Typically, an electrochromic device 1 comprises, as shown in FIG. 1, oppositely placed glass plates 3 with transparent electrode layer 2 formed thereon, and on one of the transparent electrode layers 2 is formed an electrochromic layer 4. Further, spacers 5 made of vinyl or the like are provided on the sides, in which electrolyte 6 is filled. As the electrolyte, a normal sulfuric acid with 10% by volume of glycerol mixed therein can be used, for instance. Accordingly, if a voltage is applied in a predetermined direction between the two electrodes 2, 2, the electrochromic film 4 is colored; whereas, it is discolored by the application of voltage in the opposite direction. With regard to the materials for formation of such an electrochromic film, various materials such as inorganic compounds ($WO_3$, for instance) and organic compounds (biologen compound, for instance), etc. have been proposed and typically $WO_3$ is employed.

Heretofore, for the formation of an electrochromic film with $WO_3$ (tungsten oxide), $WO_3$-powder has been employed and the film formed on a substrate comprising glass plates coated with transparent conductive film (NESA film) by vacuum deposition process. The $WO_3$-film formed on a substrate under the vacuum deposition process is colored and discolored to perform the electrochromic operation on voltage impression, but industrial mass-production of such a $WO_3$-film having a large area is difficult, and the $WO_3$-film has a problem in strength so that it peels off the substrate, thereby hindering practical application. To prevent such peeling, methods such as heating a substrate to high temperatures for degassing, special use of adhesives and mixing of bubble absorbent in electrolyte to suppress bubble formation in electrolyte as a cause of peeling, etc. have been proposed, but satisfactory results cannot be obtained by these conventional techniques, which in addition require special additives and cannot be said advantageous in manufacture.

SUMMARY OF THE INVENTION

The disadvantages of the prior art are overcome with the present invention and an improved electrochromic display device and a method for forming an improved electrochromic film are provided. One of the advantages of the present invention can be obtained by providing a reactor comprising one electrode to which a tungsten sheet is fixed as a target and a counter-electrode holding a substrate thereon, into which mixed gas containing oxygen gas and inert gas at a specified mixing ratio is introduced and held under the condition of specified total pressure and, while holding the said substrate at a specified temperature, a specified voltage is applied between the two electrodes and a $WO_3$-sputtered film is formed on the substrate for use as electrochromic film. In this case, it is preferable to use Ar gas as the inert gas and set the oxygen gas content to a range from 1 to 20%. Further, it is preferable to set the total pressure of mixed gas to a range from $5 \times 10^{-3}$ to $1 \times 10^{-1}$ Torr. As a voltage to be applied between the two electrodes, either DC or high-frequency AC may be applied. That is, this process is characterized by its formation of an electrochromic film on a substrate under the reactive sputtering method, which causes the electrochromic film to be formed by sputtering atoms having remarkably greater energy than in the case of evaporation and active gas in the sputtering atmosphere, and further improves adhesive strength. Moreover, since it allows a film to be formed under the reactive sputtering process, it is also suitable for the continuous formation at room temperature and thus provides a process which is advantageous in the industrial application.

Another advantage of the present invention can be obtained by providing a first electrode on which an electrochromic film is formed under the above-mentioned process with the surface of the electrochromic film in contact with electrolyte, placing a second electrode in contact with the electrolyte and controlling the voltage applied between the first and second electrodes to cause the electrochromic film to work in unsaturated condition. That is, according to the studies made by the present inventors, when an electrochromic film is colored by the application of voltage, such coloring proceeds from the contact surface between the electrolyte and the electrochromic film towards the bond surface between the electrochromic film and the first electrode, and on reaching the bond surface, the saturation condition of coloring is attained. If the electrochromic film reaches the saturated condition in this way, bubbling occurs at the contact surface between the electrochromic film and electrolyte and at the boundary with the first electrode, which is the cause to bring about peeling of the film. Accordingly, the present invention provides an electrochromic display device in which the voltage applied between the first and second electrodes is controlled to cause the electrochromic film to work in unsaturated condition at all times, thus eliminating the cause of film peeling directly and improving reliability of operation and making long-term use possible.

Furthermore, in accordance with the present invention, the voltage control to secure unsaturated condition can be achieved by optional means. For instance, one may employ the method to limit the applied voltage with respect to an electrochromic film having a certain thickness or to limit the time of voltage application in the case where a predetermined voltage is applied. In principle, with respect to an electrochromic film having a certain thickness, one may hold the amount of charge injection below that of saturation. However, as described hereinafter, there is a time lag between the time-dependent changes in light transmittance due to electrochromic phenomenon and the time-dependent changes in transmission current for a certain applied voltage and therefore when controlling the voltage between the first and second electrodes, this point should be taken into consideration.

A further advantage of the present invention can be achieved by forming on the second electrode the same electrochromic film as the one on the first electrode and making the volume of the electrochromic film on the first electrode substantially identical with the volume of the electrochromic film on the second electrode.

An additional advantage of the present invention can be achieved by forming an electrochromic film to be used as a display electrode into a number of small parts. The electrode commonly has the edge effect or the characteristic that the electric field strength is relatively larger at it edge, and this is not negligible in some cases. In the case of an electrochromic device, the degree of coloration is relatively intensified at the edge due to such edge effect. Such gradual change in color density can be eliminated by subdividing the electrochromic film.

Accordingly, an object of the present invention is to provide a process for forming an electrochromic film of any desired shape and area, which is improved in resistance to peeling by increasing the adhesion strength to an electrode, whereby it becomes unnecessary to add special additives to the electrolyte.

Another object of the present invention is to provide a process for forming an electrochromic film which is suitable for continuous operation at room temperature thereby making production at low cost possible.

A further object of the present invention is to provide an electrochromic display device in which film peeling is prevented nearly completely by insuring to keep an electrochromic film in unsaturated condition, and reliability of performance and durability are improved.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view showing an example of a typical electrochromic display device.

FIG. 2 is a schematic illustration showing the vacuum system of the DC sputtering device to be used for the formation of an electrochromic film according to the present invention.

DESCRIPTION OF THE PREFERRED EMBODIMENTS

Figure 3:
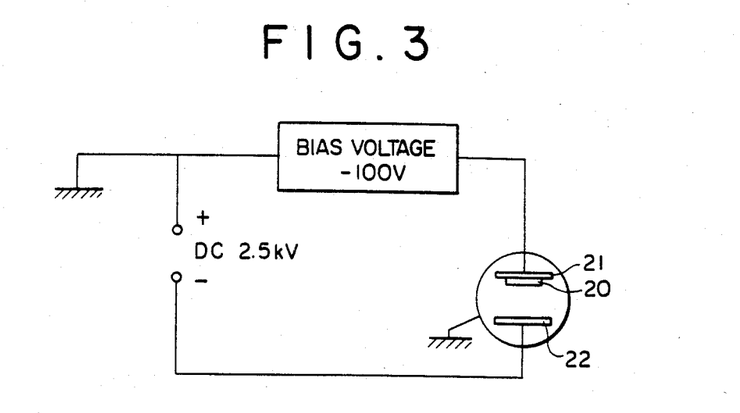
FIG. 3 is a schematic illustration showing the electrical system of the DC sputtering device.
Figure 4:
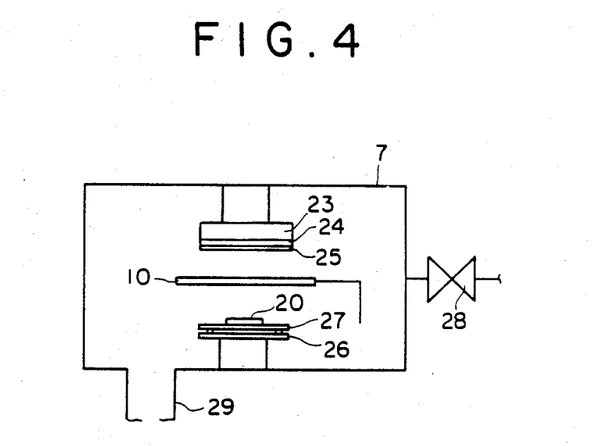
FIG. 4 is a schematic illustration of the interior of the reactor of the high-frequency sputtering device to be used for the formation of an electrochromic film according to the present invention.

First, a detailed description will be had with respect to several embodiments of the process for forming an electrochromic film according to the present invention. FIG. 2 shows the vacuum system of the DC sputtering device to be used for the present process. As shown in FIG. 2, it comprises, for monitoring of the interior of a reactor 7, a viewing port 8, a substrate holder 9, a shutter 10, a target electrode 11, a liquid nitrogen trap 12, a main valve 13, a variable leak valve 7', an oil diffusion pump 13, a coarse drawing valve 15, a Geissler tube 16, a leak valve 17, an auxiliary valve 18 and an oil rotary pump 19, etc. FIG. 3 indicates the electrical system of the DC sputtering device, in which a substrate 20 comprising a glass plate coated with a transparent conductive film is held at the anode 21 with the cathode 22 functioning as a target electrode. FIG. 4 is a schematic of the interior of the reactor of the high-frequency sputtering device. In the reactor 7, a target 25 is fixed to the back plate 24 fitted to the upper electrode 23, and a lower electrode 26 placed on the opposite side in relation to the shutter 10 is provided with a heater 27 on which the substrate 20 is held. Further, the reactor 7 is provided with a valve 28 and an exhaust port 29.

First, the embodiment in which an electrochromic film is formed with using the DC sputtering device will be described. In this case, a metallic tungsten plate, 80 mm in diameter and 1 mm in thickness, is employed as the target and fixed to the circular cathode top. As the substrate, soft glass coated with a conductive transparent film is employed and held on the bottom of the anode. The distance between the anode and the cathode is held at 37 mm and the reactor interior is once evacuated to $5 \times 10^{-6}$ Torr. Next, mixed gas of argon and oxygen containing 4% oxygen gas is introduced by opening the variable leak valve 7' and the total pressure of mixed gas within the reactor is held at $5 \times 10^{-2}$ Torr. Holding the substrate temperature at 200° C., a DC voltage of 2.4 KV is applied between the anode and cathode to initiate discharge and a film is formed on the substrate by opening the shutter. If discharge is continued for 50 minutes with the cathode current of 10 mA, a film of about 3,000 Å thick is formed.

Next, another embodiment in which an electrochromic film is formed with the use of the high-frequency sputtering device will be described. As the target, a metallic tungsten sheet, 80 mm in diameter and 1 mm in thickness, is employed it is fixed with a conductive adhesive to the back-plate of the upper high-frequency electrode. As the substrate, soft glass coated with a transparent conductive film is employed and held on the heater above the lower high-frequency electrode. The distance between the target and the substrate is held at 66 mm and the reactor interior is once evacuated to $5\times10^{-6}$ Torr. Next, mixed gas of argon and oxygen containing 6% oxygen gas is introduced by opening the needle valve and the total pressure of mixed gas within the reactor is held at $4\times10^{-2}$ Torr. The substrate temperature is held at 200° C. High-frequency AC voltage of 13.5 MHz is applied between the electrodes to initiate discharge with the high-frequency power maintained at 100 W. On opening of the shutter, a film begins to be formed on the substrate and if discharge is continued for 60 minutes, a film of about 4,000 Å in thickness will be formed.

Figure 5:
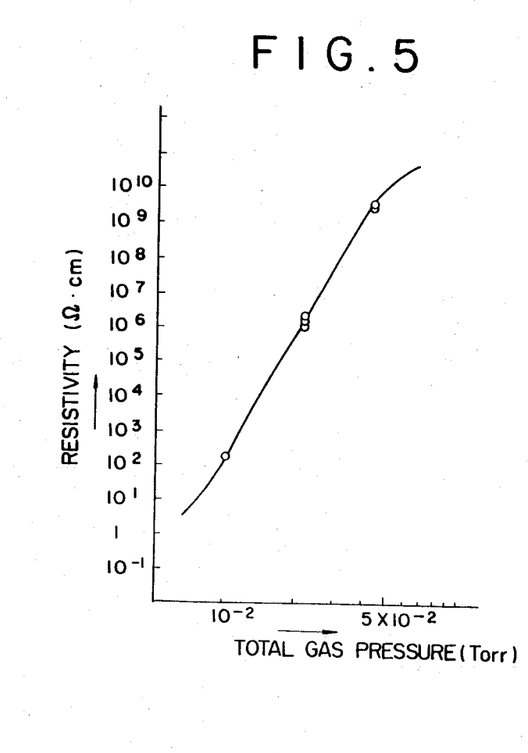
FIGS. 5 to 11 are the graphs showing the characteristics of the electrochromic film formed under the process of the present invention.
Figure 6:
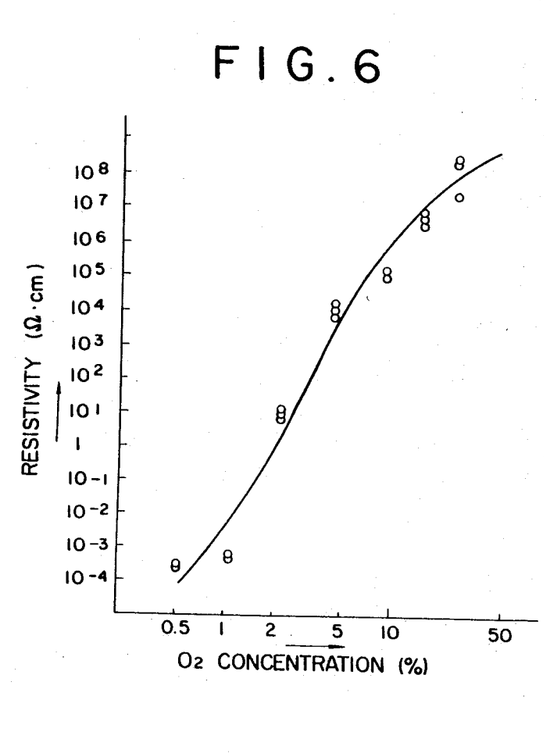
Figure 7:
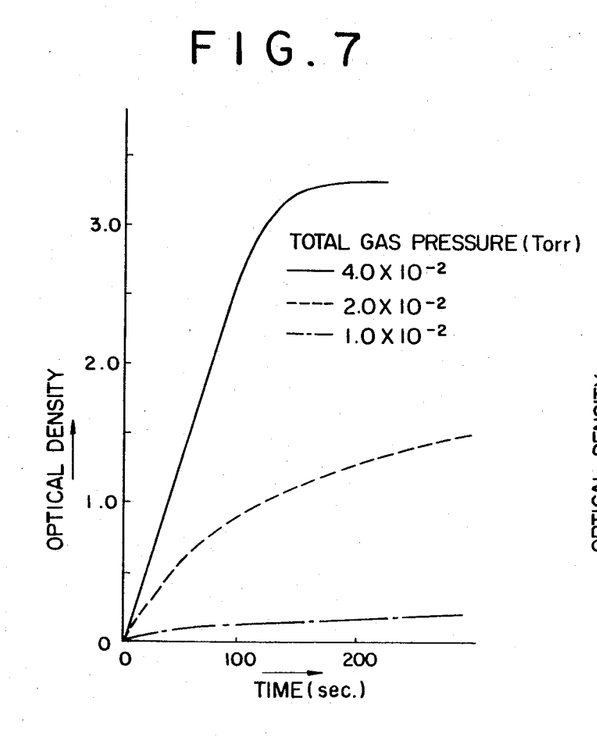
Figure 8:
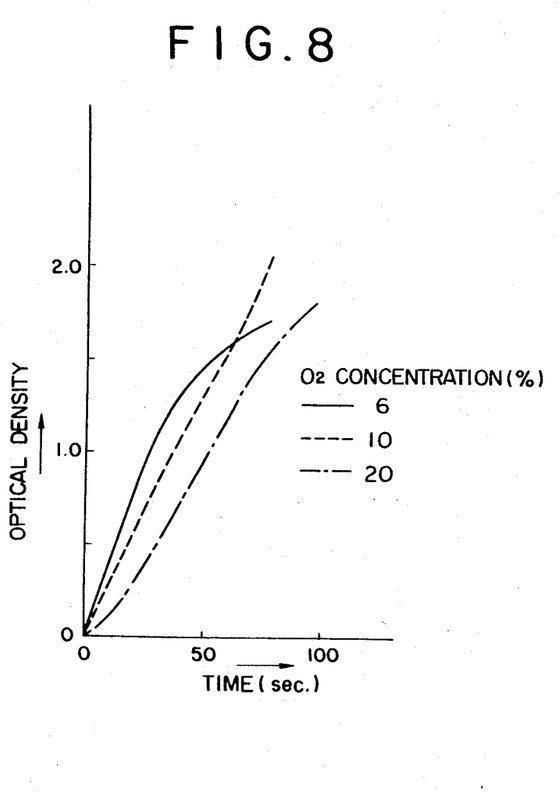
Figure 9:
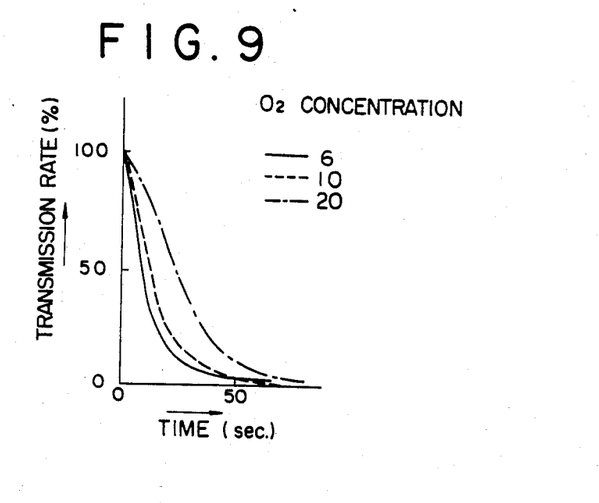
Figure 10:
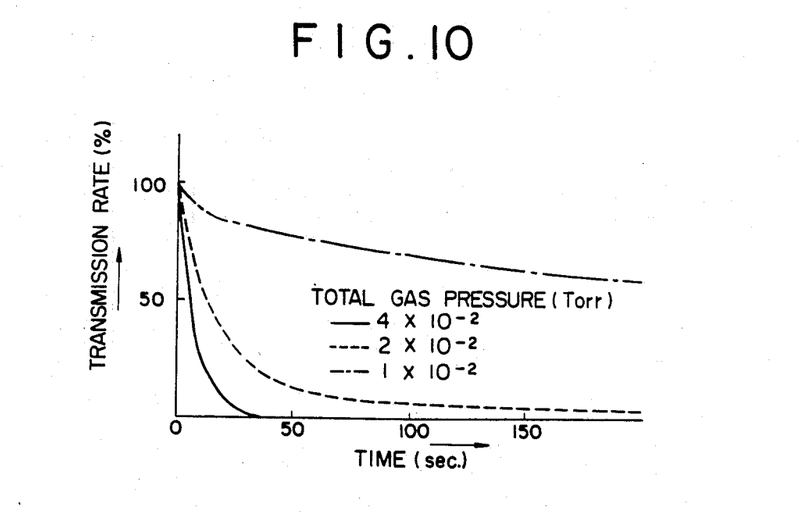
Figure 11:
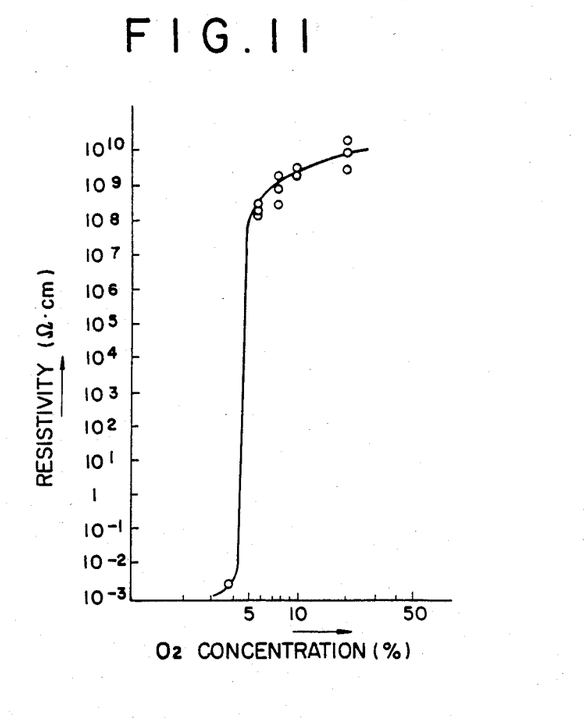

FIGS. 5 to 11 are the graphs showing the characteristics experimentally obtained with respect to the electrochromic film formed as above. FIG. 5 represents the case of high-frequency sputtering where the film thickness of 3,100 to 4,600 Å was obtained in the environment of Ar+10% $O_2$. FIG. 6 represents the case of DC sputtering where the total pressure was $5\times10^{-2}$ Torr. FIG. 7 indicates the case of high-frequency sputtering where the total gas pressure was taken as a parameter in the environment of Ar+10% $O_2$. On the other hand, FIG. 8 similarly represents the case of high-frequency sputtering in which the total gas pressure was $4\times10^{-2}$ Torr with the amount of $O_2$ taken as a parameter. FIG. 9 represents the case of high-frequency sputtering where the total gas pressure was $4\times10^{-2}$ Torr with the amount of $O_2$ taken as a parameter. Further, FIG. 10 represents the case of high-frequency sputtering where the total gas pressure was taken as a parameter in the environment of Ar+10% $O_2$. Finally, FIG. 11 represents the case of high-frequency sputtering where the total gas pressure was at $4\times10^{-2}$ Torr.

On the basis of the above experimental data, it has been found that the optimum conditions for film formation under the sputtering process of the present invention are determined as aforesaid and the electrochromic phenomenon can be obtained advantageously if the resistivity of the electrochromic film thus formed is in the range from $1\times10^1$ to $1\times10^{10}\Omega\cdot cm$.

Figure 12:
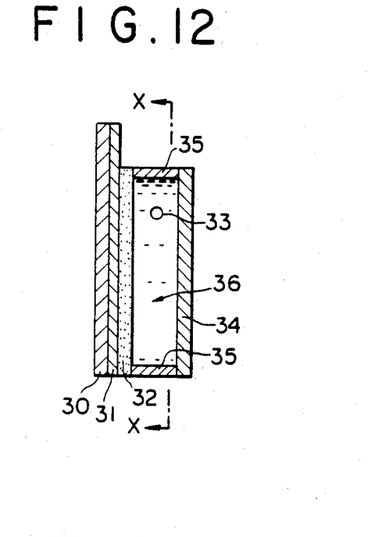
FIG. 12 is a cross-sectional view showing an embodiment in the case where the metal needle is employed as the counter-electrode in the electrochromic display device of the present invention.
Figure 13:
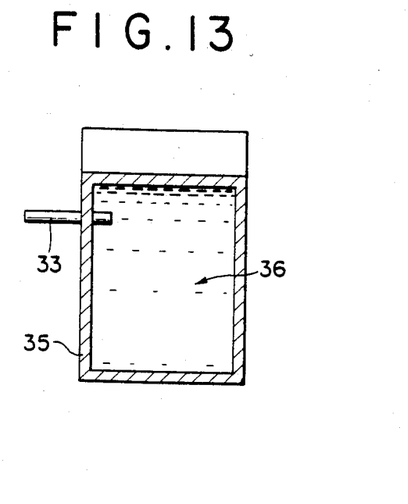
FIG. 13 is a cross-sectional view in the X—X direction in FIG. 12.

Next, the manufacturing process of an electrochromic display device using a $WO_3$-sputtered film formed in accordance with the present invention will be described. As shown in FIGS. 12 and 13, a substrate comprising soft glass 30 whose surface is coated with a transparent conductive film 31 having sheet resistance of $35\Omega$/square, on which $WO_3$-sputtered film 32 is formed by means of the DC sputtering device, and soft glass 34 is provided. Next, to provide an electrolyte storage space above $WO_3$-sputtered film 32, acrylic resin spacers 35 of 2 mm thick are prepared. In this case, a hole with a diameter of 0.8 mm for the injection of electrolyte is provided in the spacer side. Using adhesives, the substrate on which $WO_3$-sputtered film 32 is formed by evaporation, spacers 35 and the glass plate 34 are assembled together. Next, using the hole, electrolyte 36 is injected with a syringe or the like, for instance. As the electrolyte 36, it is preferable to use the aqueous solution of one normal sulfuric acid with 10 vol. % of glycerol added thereto, for instance. On the other hand, it is preferable to use the hole for electrolyte injection as a hole for insertion of steel wire of approximately 0.8 mm in diameter to serve as a counter-electrode.

Further, in the case where a $WO_3$-sputtered film formed with the high-frequency sputtering device is used, it is preferable to provide a substrate on which a $WO_3$-film is formed on a transparent conductive film with sheet resistance of $35\Omega$/square, an acryl plate with metallic indium of approximately 1 mm in diameter to serve as a counter-electrode inserted therein, and spacers made of insulating material to be of 2 mm thick and provided with a hole of 0.6 mm in diameter for electrolyte injection in the side and to use the aqueous solution of normal lithium perchlorate with 10 vol. % glycerol added thereto as the electrolyte.

If, a voltage is applied to the electrochromic display device thus manufactured with $WO_3$-electrode as a cathode, $WO_3$-film turns blue; whereas, it loses color if the direction of the applied voltage is reversed. If the voltage of 0.5 V is applied to the electrochromic display device made from the above-described electrolyte and transparent conductive film with $WO_3$-film of 3,000 Å in thickness and effective $WO_3$ area of 2.0 cm², about 17 mC of charges are injected into the film in 15 sec. of coloring time and $WO_3$-film is colored. In this case, assuming transmittance before coloring to be 100% for monochromatic light with wavelength of 5,000 Å, the transmittance becomes approximately 30%, but coloring is not saturated. If, in the case of coloring of $WO_3$-film, the electrochromic film is colored and discolored in unsaturated condition as above without injecting 32 mC of charges required for saturation of coloring of the film with said thickness into the film, this device will operate stably for many hours.

Figure 14:
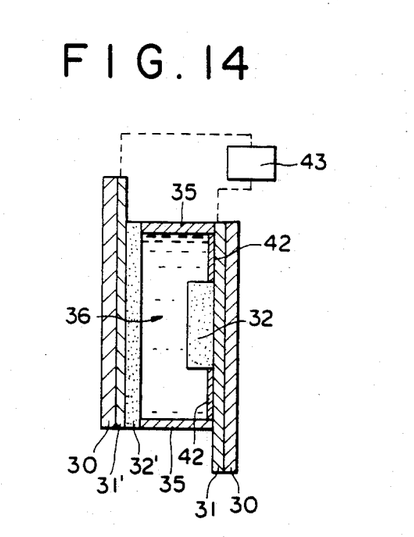
FIG. 14 is a cross-sectional view showing an embodiment in the case where the electrochromic film is also formed as the counter-electrode in the electrochromic display device according to the present invention.

Next, the manufacturing process will be described as to the case of embodiment shown in FIG. 14. In this case both of the display electrode and the counter-electrode are formed of electrochromic films. First, on the transparent conductive film 1 with sheet resistance of $35\Omega$/square, two sheets of glass substrate 30 provided with $WO_3$-films 32, 32', different in thickness and formed in a manner similar to the above-mentioned embodiment, are provided. In this case, however, $WO_3$-film 32 to be used as a display electrode and $WO_3$-film 32' to be used as a counter-electrode are made substantially the same in volume. This is because, if there is a difference in volume between the two, the volume difference acts as resistance and slows down the motion of charges within film and thus lowers the coloring capacity of electrochromic film. Next, an adhesive is applied to the spacers 35 of 2 mm thick and provided in the side with a hole of 0.6 mm in diameter as an electrolyte injection port, and the substrate-spacers-substrate structure is bonded together and assembled en bloc. Next, using a syringe, for instance, electrolyte is injected into the device. As the electrolyte, it is preferable to use one normal aqueous solution of sulfuric acid with 10 vol. % of glycerol added thereto, for instance. Lastly, a voltage application means 43 is connected to the display electrode 31 and the counter-electrode 31' to form a structure capable of applying a voltage under control. In this embodiment, $WO_3$-film 3 of the display electrode had a thickness of 3,000 Å and an effective surface area of 3.0 cm², and $WO_3$-film 3' of the counter-electrode had a thickness of 6,000 Å and an effective surface area of 1.5 cm².

If a voltage of 2.5 V is applied by the voltage application means 43 to the electrochromic display device constructed as above with a negative polarity to the display electrode, $WO_3$-film 32 of the display electrode is colored, under the condition that approximately 18 mC of charges are injected into the film and the film remains unsaturated condition with transmission rate of 30%. Next, if a voltage of 1 V is applied with the counter-electrode as a negative polarity, WO₃-film 32 of the display electrode loses color, thereby recovering the transmission rate to the original value. At the same time, 18 mC of charges are injected into WO₃-film 32' of the counter-electrode and the film is slightly colored. In this case, since WO₃-film of the display electrode and that of counter-electrode are different in surface area, the degree of coloring is different between the two and WO₃-film of the display electrode smaller in surface area is colored much more than WO₃-film of the counter-electrode. The amount of charges required for the saturation coloring of WO₃-film having the above-mentioned thickness used as the display electrode is 82 mC and that for WO₃-film used as the counter-electrode is 40 mC. Accordingly, in the device of this embodiment, it is possible to maintain unsaturated condition during operation by controlling the voltage applied by the voltage application means 43 to limit charge injection to less than 40 mC at all times.

Next, the principle that the peeling of electrochromic film can be eliminated by maintaining unsaturated condition will be explained with reference to FIG. 15.

The electrochromic reaction using WO₃-film is an electrochemical reaction in which a color center $H_xWO_3$ (hydrogen tungsten bronze) is formed by double-injection of electron and proton (H+) into WO₃ for coloring. The reaction in this case can be expressed by the following equation (1).

$$WO_3 + xH^+ + xe^- \longrightarrow H_xWO_3 \quad (1)$$
(Transparent)　　　(Blue)

Figure 15:
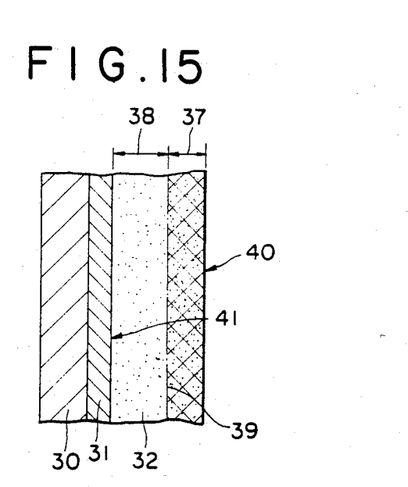
FIG. 15 is a schematic illustration which is useful for explaining the electrochromic coloring phenomenon.

Explaining this with reference to FIG. 15, if a voltage is applied with WO₃-film 32 as negative, H+ ion is injected from the electrolyte into WO₃-film 32 and $H_xWO_3$ (hydrogen tungsten bronze) is fomed. The value of x in Hx is a value dependent on the applied voltage and the material of counter-electrode, but the degree of coloring changes little with the value x. Accordingly, the color front 39 formed between the colored portion of $H_xWO_3$ 37 and the uncolored portion of WO₃ 38 is considered to advance from the contact surface 40 between WO₃-film 32 and the electrolyte towards the bond surface 41 between the WO₃-film and the substrate as charges are injected. The position of color front 39 shown in FIG. 15 indicates that WO₃-film 32 is in unsaturated condition. When the color front 39 has reached the bond surface 41, the condition of saturated coloration is established and any further increase in voltage does not cause an increase in the degree of coloring.

Since resistivity of $H_xWO_3$ is $10^{-4}$ Ω·cm similar to that of metals, if a voltage higher than the voltage (1.67 V) required for electrolysis of water is applied between the WO₃-electrode and the counter-electrode after saturated coloration, H is generated at the bond surface 41 of WO₃-film 32 which has been changed to $H_xWO_3$ and its contact surface 40 with electrolyte. In other words, at the time of saturated coloration of WO₃-film 32, the color front 39 has reached the bond surface 41 and therefore, at the bond surface 41, contact with WO₃-film is replaced by contact with $H_xWO_3$-film and bubbling begins so that WO₃-film 32 tends to peel off the substrate. Accordingly, if WO₃-film 32 is maintained in unsaturated condition at all times, that is, preventing the color front 39 from reaching the bond surface 41, it is possible to prevent effectively the occurence of degradation of adhesives and bubbling at the bond surface thereby preventing the occurence of peeling of WO₃-film.

Figure 16:
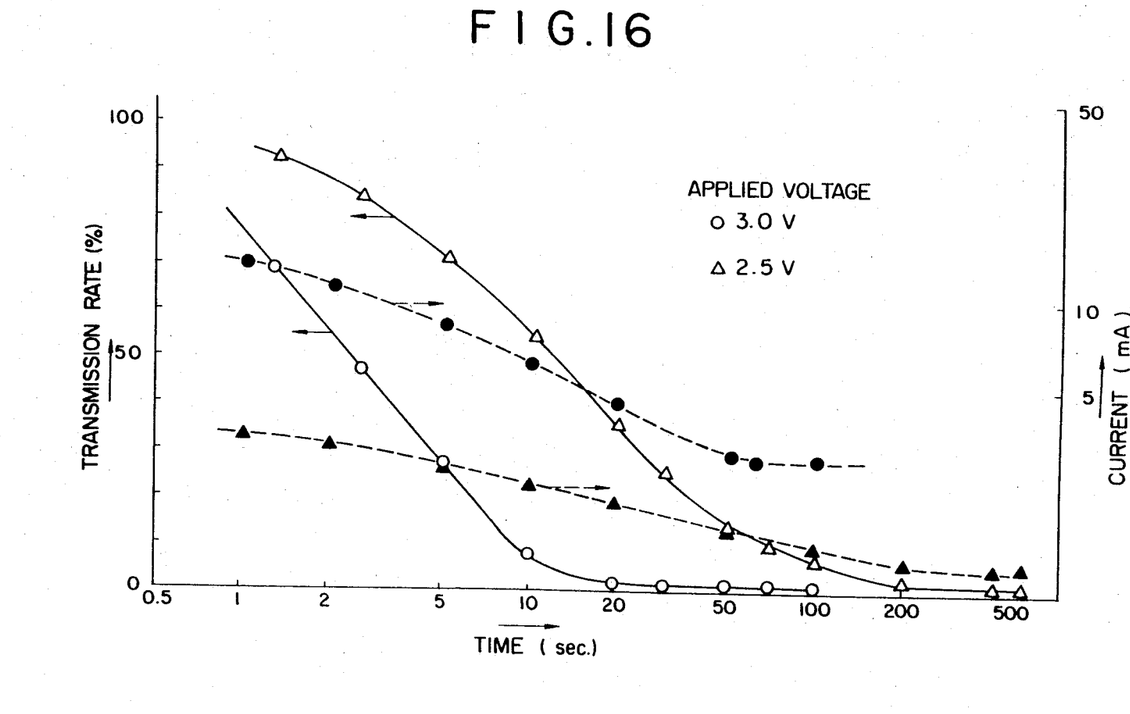
FIGS. 16 to 19 are the graphs showing the electrochromic characteristics of the electrochromic display device according to the present invention.

FIG. 16 indicates changes, after application of certain voltages, in current passing through WO₃-film of the present electrochromic display device and coloring (transmission rate of light with wavelength of 5,000 Å) in relation to time, showing that convergence upon certain values and saturated condition appear after the lapse of certain times. As shown in this graph, current saturation occurs after coloring saturation and there is a lag between the two. This means that when current is to be controlled to maintain unsaturated condition, such a time lag should be taken into consideration.

Figure 17:
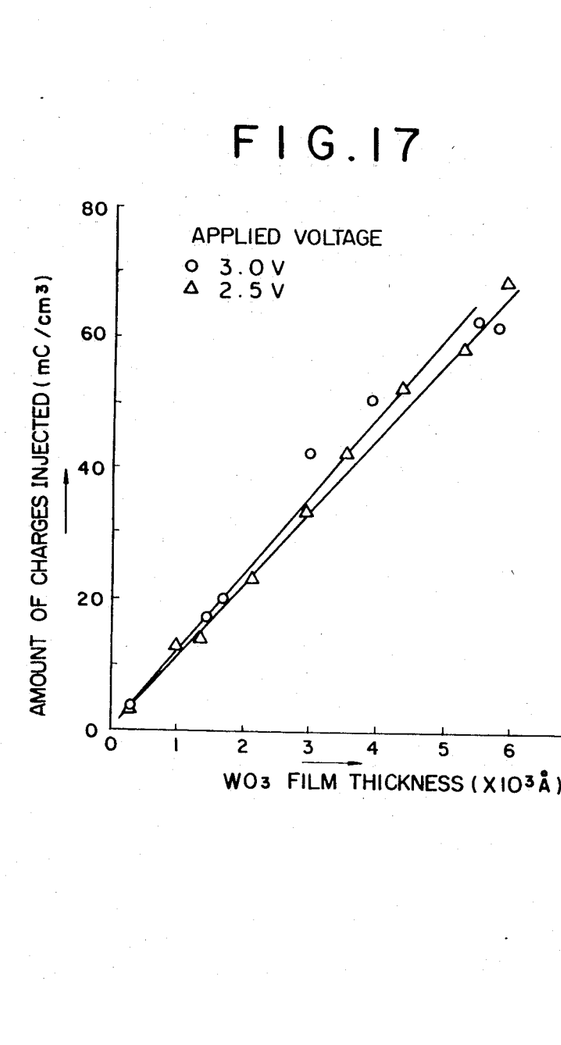
Figure 18:
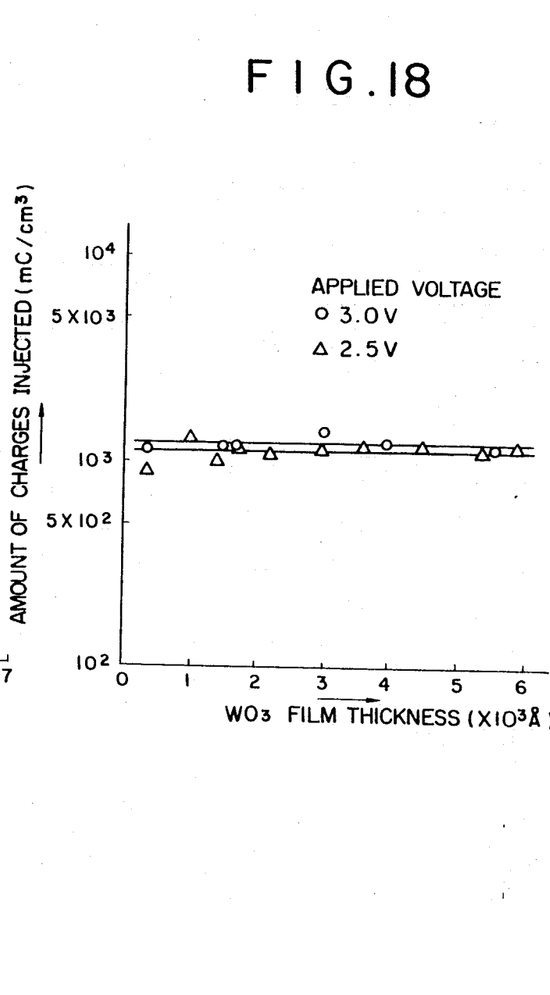
Figure 19:
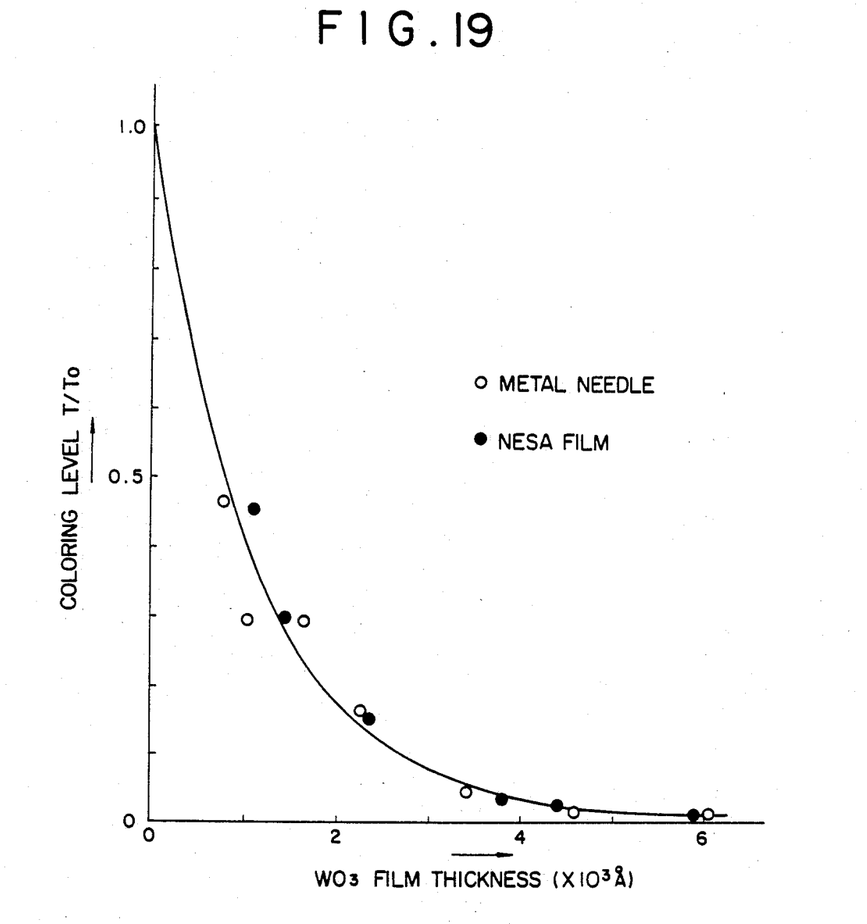

The graph in FIG. 17 indicates that the amount of charges injected per unit area of WO₃-film electrode until saturation of coloring is in proportion to the WO₃-film thickness. That is, this graph is a plot of the relation between sample film thicknesses and the measured amount of charges required to saturate each of the samples different in film thickness. The graph in FIG. 18 indicates that when the amounts of charges per unit area injected until reaching saturation for films of different thicknesses are converted into the amounts charges per unit volume, respectively, and plotted as shown, the converted values are constant irrespective of the thickness. Further, FIG. 19 indicates that for the purpose of attaining a specific film transmission rate after saturation with respect to the film transmission rate before coloring, only the thickness of WO₃-film is influential and types of the counter-electrode and the level of the applied voltage have no effect in view of the results measured for the films of various thicknesses.

Figure 20:
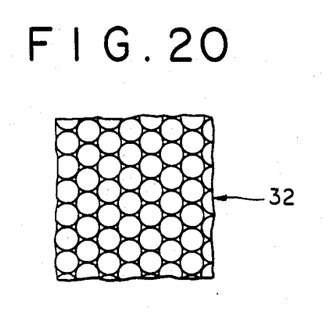
FIG. 20 is a schematic illustration showing the display electrode subdivided in a dotted pattern.
Figure 21:
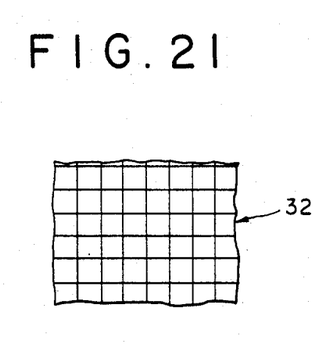
FIG. 21 is a schematic illustration showing the display electrode subdivided in a lattice pattern.

Further, in some cases, the electrochromic display device has the characteristic that due to the edge effect of the electrodes, that is, electric field being relatively stronger at the electrode edge than at the center, the degree of coloring may be relatively higher in the neighborhood of the edge of the display electrode than at its center. Such irregularities can be eliminated in effective visual vignetting by dividing the display electrode into an array of small dots or lattice form or the like as shown in FIGS. 20 and 21. For example, the representative length of 20–30 μm is appropriate for such a divided element.

As described above in detail, according to the present invention, the manufacture of an electrochromic film improved in adhesive strength is possible and since a continuous production may be carried out, it is suitable for industrial application. Further, by operating the electrochromic film always in unsaturated coloring condition to prevent bubbling and by positively eliminating the causes of peeling of film, it improves reliability of the electrochromic display device and makes its long-term use possible. In addition, according to the present invention, the electrochromic film is held in unsaturated state so that the film is maintained at low resistivity values and can also be used as a counter-electrode. Moreover, it is also possible to structure a light-transmission type display device by using films in unsaturated condition for both display and counter-electrodes. Moreover, response characterisics are improved since it is operated in unsaturated condition. In the embodiment shown in FIG. 14, it is preferrable to provide an insulation layer 42 on those portions of the conductive film 31 where no WO₃-film 32 is provided.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. A process for forming an electrochromic film comprising the steps of: introducing a mixture of oxygen gas and inert gas at a predetermined mixing ratio into a reactor which includes one electrode to which a tungsten sheet is fixed as a target and a counter-electrode holding a substrate; maintaining a predetermined total pressure condition and applying a predetermined voltage between said electrodes while maintaining said substrate at a predetermined temperature, thereby forming a $WO_x$-sputtered film on said substrate.

2. The process as in claim 1, wherein said x in $WO_x$ is in the range between 2 and 3.

3. The process as in claim 1 wherein said inert gas is Ar gas and the amount of oxygen gas is in the range from 1 to 20%.

4. The process as in claim 1, wherein the total pressure of said mixed gas introduced into said reactor is set within a range from $5 \times 10^{-3}$ to $1 \times 10^{-1}$ Torr.

5. The process as in any of the claims 1 to 4 wherein the voltage applied between said electrodes is a DC voltage.

6. The process as in any of claims 1 to 4, wherein the voltage applied between said electrodes is a high-frequency AC voltage.

7. An electrochromic display device comprising: a first electrode on which an electrochromic film is formed, the surface of said electrochromic film being in contact with electrolyte; a second electrode provided in contact with said electrolyte; and means for applying a voltage between said first and second electrodes whereby said electrochromic film is operated in unsaturated condition by controlling said applied voltage.

8. An electrochromic display device as in claim 7, wherein said electrochromic film is a $WO_3$-sputtered film formed by a DC sputtering process.

9. An electrochromic display device as in claim 7, wherein said electrochromic film is a $WO_3$-sputtered film formed by a high-frequency sputtering process.

10. An electrochromic film display device as in any of claims 7 to 9, wherein said electrochromic film is formed also on said second electrode and said second electrode is placed opposite to said first electrode.

11. An electrochromic display device as in claim 10, wherein the volume of the electrochromic film formed on said first electrode is substantially equal to the volume of the electrochromic film formed on said second electrode.

12. An electrochromic display device as in claim 10, wherein an insulating film is formed on said second electrode except where said electrochromic film is formed thereon.

13. An electrochromic display device as in claim 7, wherein the electrochromic film formed on said first electrode is subdivided.

14. An electrochromic display device as in claim 13, wherein said subdivision includes an array of small dots.

15. An electrochromic display device as in claim 13, wherein said subdivision is a lattice-like subdivision.

* * * * *

United States Patent [19]

Dowden et al.

[11] Patent Number: 4,526,441
[45] Date of Patent: Jul. 2, 1985

[54] METHOD AND ELECTROLYTIC DISPLAY FOR SELECTIVELY DISPLAYING AN IMAGE

[75] Inventors: Barry F. Dowden, Romsey; Donald J. Barclay; David H. Kirkman, both of Winchester, all of England

[73] Assignee: International Business Machines Corporation, Armonk, N.Y.

[21] Appl. No.: 375,905

[22] Filed: May 7, 1982

[30] Foreign Application Priority Data

Jun. 30, 1981 [EP]  European Pat. Off. ........ 81302961.8

[51] Int. Cl.³ ............................ G02F 1/19; G02F 1/17
[52] U.S. Cl. ..................................... 350/357; 350/363
[58] Field of Search ............... 350/288, 357, 363; 340/718-719, 763, 783, 785; 368/239; 358/236

[56]  References Cited

U.S. PATENT DOCUMENTS 3,096,271  7/1963  Hespenheide ........................ 340/763
3,692,388  9/1972  Hall, Jr. et al. ..................... 350/363
4,436,378  3/1984  Kirkman ............................. 350/357

FOREIGN PATENT DOCUMENTS 1912      5/1979   European Pat. Off. ............ 350/357
208530  12/1982   Japan ................................... 350/288
208531  12/1982   Japan ................................... 350/288

OTHER PUBLICATIONS

Tell et al., "Electrochemichromic Cells Based on Phosphotungstic Acid", App. Phy. Lett. 11-1-78, pp. 837-838.

Primary Examiner—William H. Punter
Attorney, Agent, or Firm—Yen S. Yee; Roy R. Schlemmer

[57]  ABSTRACT

An image is displayed in an electrolytic display by the reversible deposition on electrodes having non-scattering surfaces of a deposit having light scattering properties. The deposit scatters incident light out of the specular direction and the image is formed from one only of the specular and non-specular components of the emergent light.

9 Claims, 7 Drawing Figures